F. W. MEYER.
FREQUENCY CHANGER.
APPLICATION FILED MAR. 24, 1915.

1,275,967.

Patented Aug. 13, 1918.
3 SHEETS—SHEET 1.

WITNESSES:
R. J. Fitzgerald
D. C. Davis

INVENTOR
Friedrich W. Meyer.
BY
Wesley G. Carr
ATTORNEY

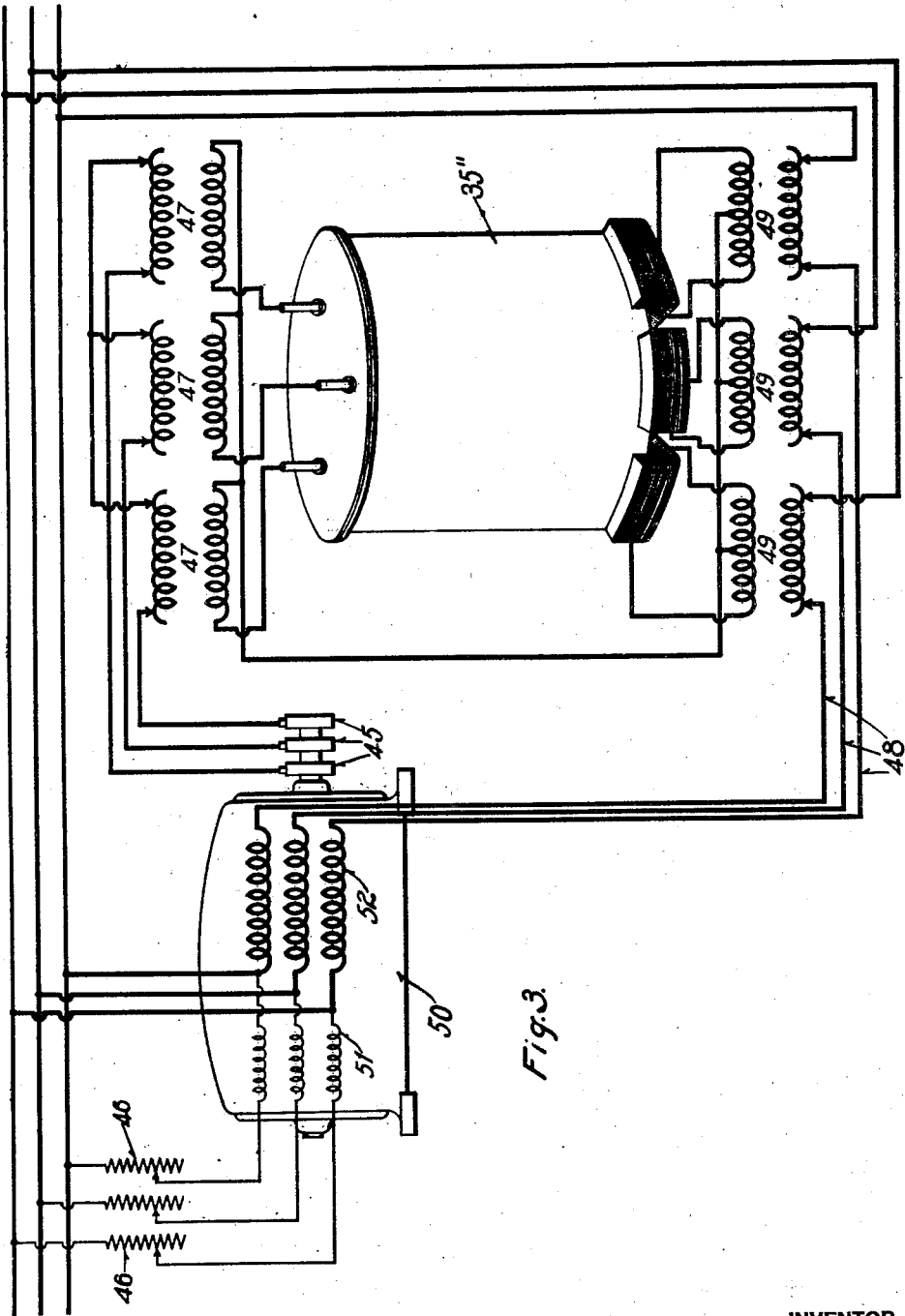

UNITED STATES PATENT OFFICE.

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

FREQUENCY-CHANGER.

1,275,967.

Specification of Letters Patent. Patented Aug. 13, 1918.

Application filed March 24, 1915. Serial No. 16,679.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in Frequency-Changers, of which the following is a specification.

My invention relates to current converting systems, and it has for its object to provide circuits and apparatus whereby energy from one polyphase system may be supplied to another polyphase system of different frequency or of both different frequency and number of phases, without the use of heavy moving parts.

Figure 1:
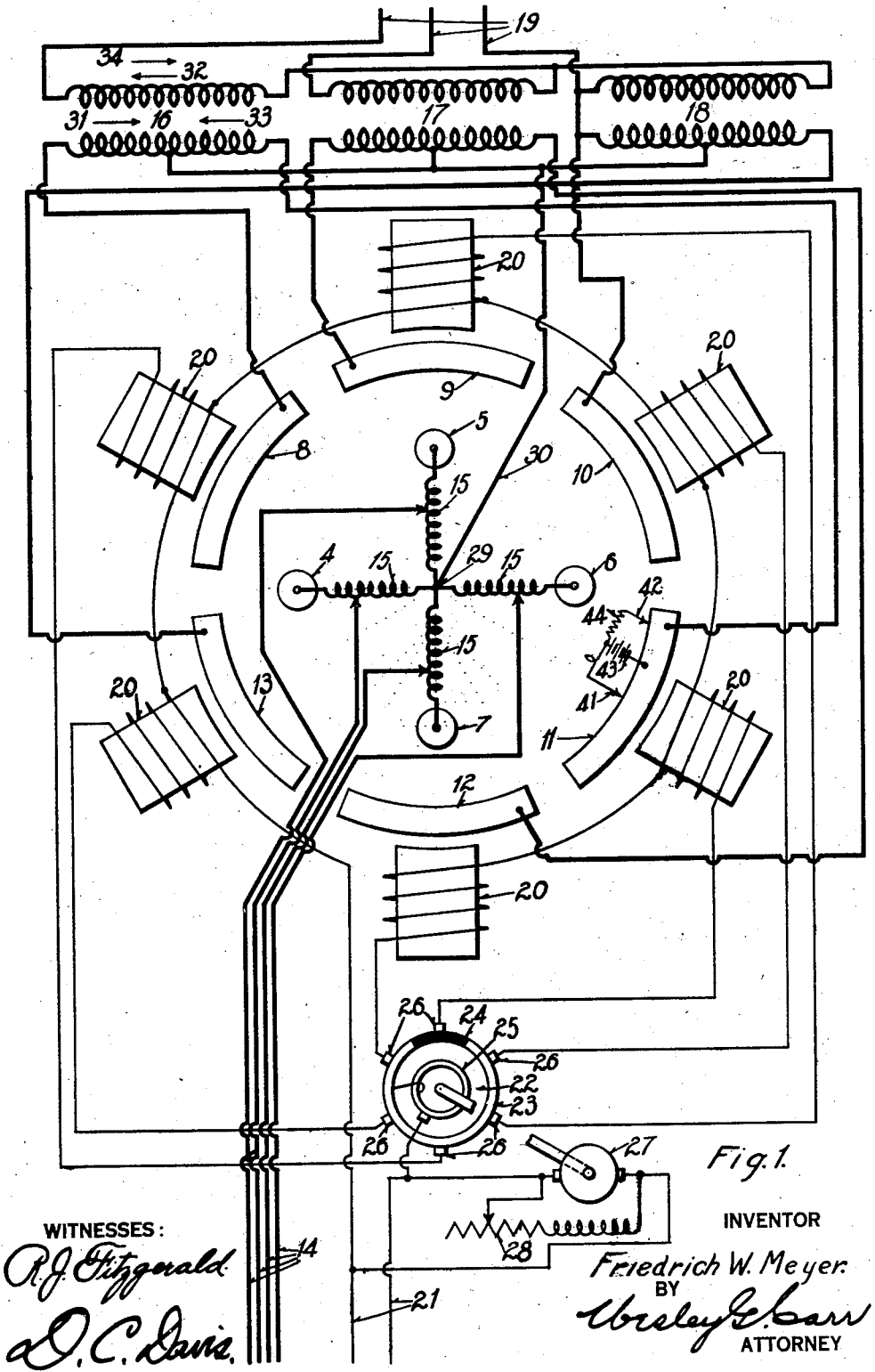
Figure 2:
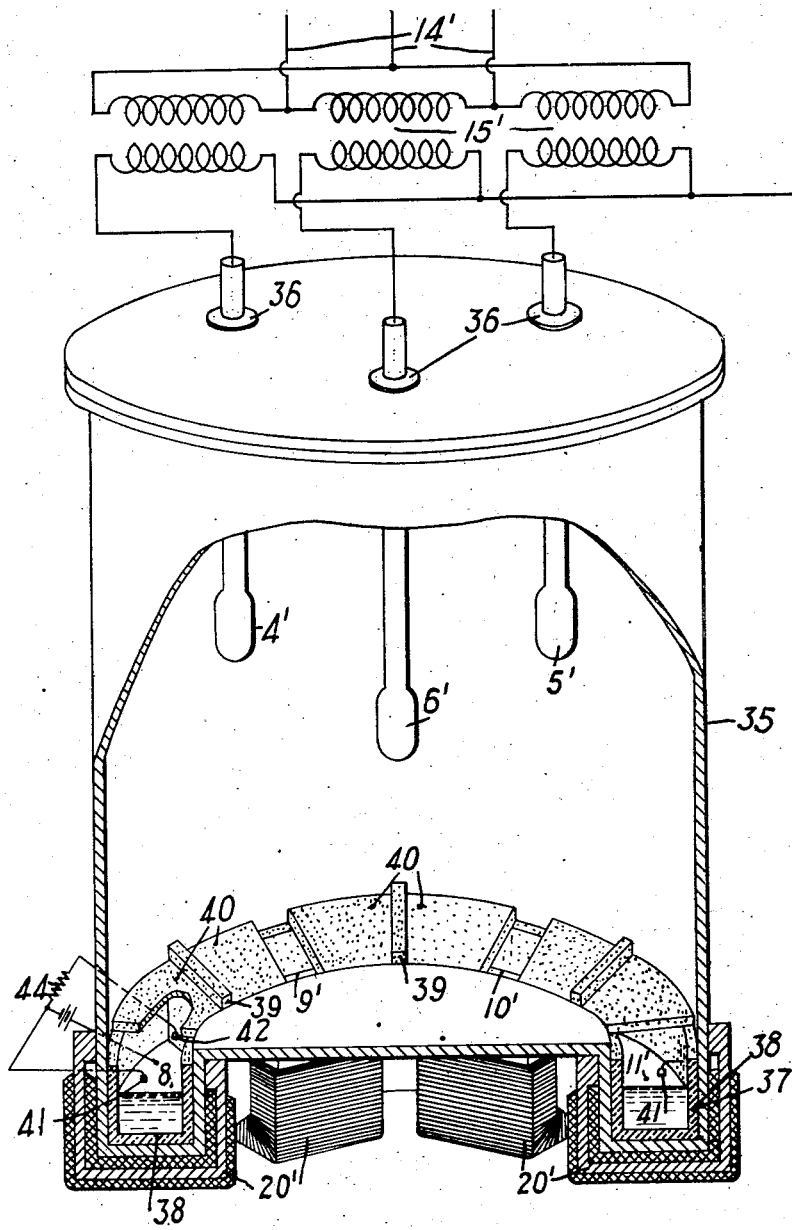

In the accompanying drawings, Figure 1 is a diagrammatic plan view of a vapor converter and its attendant circuits embodying a form of my invention; Fig. 2 is a perspective view, partially in section, of a vapor electric apparatus embodying another form of my invention, and Fig. 3 is a diagrammatic view illustrating one possible use of my vapor converting system in returning energy from the secondary circuit of an induction motor to the supply mains.

Up to the present time, many attempts have been made to design suitable frequency changers whereby, for example, energy could be transferred from a sixty cycle system to a twenty-five cycle system or conversely, and the only systems which have met with any commercial success are those involving heavy moving parts, such, for example, as motor generators or induction motors operating as general transformers. There is no inherent necessity for employing the inertia of a heavy moving part when converting energy from the form suitable for one polyphase system to the form suitable for another polyphase system of a different frequency because the energy of supply and energy of consumption are at all times constant, if the polyphase systems are substantially balanced. I have devised a system, therefore, in which energy is transferred from one polphase circuit to the other through a pair of conductors, one of which connects the neutral points of the two systems and the other of which is a mobile vapor arc similar to that in the ordinary vapor rectifier. This vapor arc operates, in succession, from a plurality of anodes connected to the supply circuit, as in the polyphase rectifier, and conveys energy to each of a plurality of cathodes connected respectively to the phases of the consumption circuit, the rate of travel from one cathode to another and, consequently, the frequency of the energy supplied to the consumption circuit being readily controllable by suitable magnetic means.

Referring to the form of my invention shown in Fig. 1, a plurality of anodes 4, 5, 6 and 7 and a plurality of cathodes 8 to 13, inclusive, are mounted in a suitable evacuated container shown at 35 in Fig. 2. The negative-electrode reluctance of the cathodes is maintained in a broken down condition in a particular manner to be explained in detail in connection with Fig. 2. The four anodes 4, 5, 6 and 7 are connected, respectively, to the mains 14 of a quarter-phase supply circuit through suitable adjustable auto-transformers 15—15. The cathodes 8 to 13, inclusive, are arranged to form substantially a ring for a purpose to be hereinafter pointed out, and diametrically opposite cathodes are connected, respectively, to the terminals of the primary windings of three transformers 16, 17 and 18, the secondary windings of which are connected to a three-phase consumption circuit 19. An electromagnet 20 is mounted adjacent each of the cathodes 8 to 13, inclusive, and the magnets 20 are connected to be energized from suitable direct-current mains 21. Connection between the electromagnets 20 and the mains 21 is completed through a rotating switch 22 comprising a contact making segment 23 and a relatively short insulating segment 24. Current is supplied to the conducting segment 23 by a suitable slip ring 25 and is supplied from the segment to the electromagnets 20 by suitable brushes 26—26. The entire commutating switch 22 is rotated by any suitable means, such, for example, as a direct-current motor the speed of which may be adjusted by a suitable field rheostat 28.

Connection is made between the neutral point 29 of the quarter-phase system 14 and the mid point of the primary windings of the transformers 16, 17 and 18 by a suitable conductor 30.

Having thus described, in a general way, the structure of apparatus embodying my invention, the operation is as follows: Upon starting the motor 27, the switch 22 may be caused to rotate at any desired speed, and all but one of the electromagnets 20 will be energized, the brush 26 bearing upon the segment 24 at any particular instant receiving no current. The rotation of the insulating segment 24 will deënergize each of the magnets 20 in succession at a rate consonant with the rate of the motor 27. As a result, there will be a unidirectional magnetic flux above all but one of the cathodes 8 to 13, inclusive, and the void spot in the total resultant magnetic field, caused by the successive temporarily deënergization of the magnets 20, will sweep in succession over each cathode. Upon initiating a polyphase arc from the anodes 4, 5, 6 and 7 to a cathode in any suitable manner, said arc will at once seek out and remain in the void spot in the magnet field at the cathodes. As this void spot is rapidly rotating, the cathode end of the arc will sweep in succession over each of the cathodes 8 to 13, inclusive, and induce polyphase current in the mains 19, as will be pointed out more in detail. When the arc impinges upon the cathode 8, current will flow through the left hand half of the primary windings of the transformer 16, as indicated by an arrow 31, and return to the system 14 through the wire 30. This will produce current in the secondary winding of the transformer 16, as indicated by an arrow 32. Immediately, thereafter, the arc will impinge, in succession, upon the cathodes 9 and 10, causing current flow in the transformers 17 and 18 similar to that indicated by the arrows 31 and 32. The arc then operates upon the cathode 11 to establish current flow from the righthand end of the primary winding of the transformer 16 to the mid point thereof, as indicated by the arrow 33. This will cause current flow in the secondary winding of the transformer 16, as shown by an arrow 34. The succeeding flow of current to the cathodes 12 and 13, respectively, will, in like manner, produce current in the transformers 17 and 18 corresponding to those indicated by arrows 33 and 34, completing one entire cycle of current conversion.

It will be observed that the system 19 has a different number of phases from the system 14 and, furthermore, that, by varying the speed of the motor 27, the freqeuncy of supply to the system 19 may be varied within very wide limits. I wish to lay particular emphasis upon both of these features; viz., that I am able to convert to a different frequency and also to currents of a different phase number. The arrangement of the cathodes 8—13 in a ring particularly facilitates the operation of my device as I have found that the mass of the units comprising a vapor arc is so large as to possess considerable inertia and it is therefore highly desirable to force the movement of the cathode end of the arc in a circular path in order to avoid serious mechanical difficulties, such as would be encountered were it attempted to cause the arc to oscillate over a plurality of cathodes arranged in a row.

In order to illustrate the details of my invention, I have shown a container in Fig. 2 with parts suitably broken away to show the specific arrangement of the electrodes. A vacuum type container 35 is provided with three anodes 4', 5' and 6' connected to a three-phase supply circuit 14' through suitable transformers 15'. The anodes 4', 5' and 6' are suitably insulated from the cover by insulating joints 36, similar to those commonly employed in mercury rectifiers of the metal container type. The lower portion of the container 35 is provided with a depending annular trough 37 of non-magnetic material in which are mounted six insulating segmental shaped vessels 38 of some refractory material, such, for example, as quartz or porcelain. Cathode pools 8' to 11', inclusive, are contained in these vessels. Suitable insulating partitions 39 separate the vessels 38 from each other and rise considerably above the trough 37. Suitable refractory insulating cover plates 40—40 overlie the ends of the cathode pools, exposing only the ceneral portions thereof, as shown in connection with the pools 9' and 10'. Outside the trough 37 are mounted a plurality of electromagnets 20'—20' each of which is associated with, and embraces, the central portion of one of the cathode pools 8'—11'. The pole pieces of the magnets 20'—20' are above the surface of the liquid in the cathode pools so that the arc-actuating magnetic field extends across in proximity to the cathode surfaces. Each of the cathode pools is provided with a pair of keep-alive anodes 41 and 42, as shown in connection with the pool 8'. The keep-alive anodes of each cathode pool are energized from a suitable direct-current source, and a resistance member 44 is inserted in the lead to the anode 42 so that, in the absence of external distributing means, a keep-alive arc will operate from the anode 41 to the exclusion of the anode 42. The anode 41 is located above the central portion of the cathode pool 8' and, accordingly, within the field of the attendant magnet 20'. The anode 42 is located above the end of the pool 8' and, accordingly, outside the influence of the magnet 20'. The exact manner in which the successive deënergization of the magnets 20' causes a rotation of the main power arc is as follows: The normal tendency of the keep-alive arc to operate from the anode 41 will be prevented by the blowout action of the attendant magnet 20' and, as a result, a keep-alive arc will operate from the anode 42. In like manner, any tendency of the main power arc to operate to a cathode, when the attendant anode 20' is energized, will be frustrated by the blowout action of the magnetic field. When, however, the magnet 20' associated with a cathode is de-energized by the segment 24, the operation of the resistance member 44 shifts the keep-alive arc from the anode 42 to the anode 41 and the main power arc strikes to that cathode. It will be understood that each cathode in the devices of Figs. 1 and 2 is equipped with a keep-alive circuit of the type indicated and that the above-mentioned operation occurs with extreme rapidity at each of the cathodes in succession. Under certain conditions, it may be necessary, for successful operation, to heat the cathode pools or to form them from other materials than mercury. The six cathodes 8', 9', 10', 11' and 12' and 13', (not shown) are connected in the manner indicated in connection with the anodes 8 to 13, inclusive, in Fig. 1 and the magnets 20' are connected in a manner to be energized, as are the magnets 20—20 in the device of Fig. 1, whereby the entire structure of Fig. 2 will operate in an effective manner to transfer energy from a three-phase circuit of one frequency to another three-phase circuit of a different, and adjustable, frequency.

I have found that the above described system of operation is quite effective, as a vapor arc adjacent the cathode comprises principally electrons and, as electrons have a much smaller mass than the ions found in other portions of the arc, much less difficulty is encountered in their mechanical control.

Referring to the apparatus and circuit shown in Fig. 3, I have illustrated an important application of my invention in the speed control of polyphase induction motors, as, for example, in railway industrial applications. An induction motor 50, provided, preferably, with magnetizing windings 51 and working windings 52, is provided with a wound rotor terminating in suitable slip rings 45. The strength of the field produced by the magnetizing current may be varied by suitable rheostats 46. Energy derived from the rotor of the induction motor 50, in the speed control thereof, is suitably changed in voltage by transformers 47 and is then passed through a frequency changer 35'' of the form indicated in Fig. 2 and is thereby changed over to energy of line frequency suitable for superposition on the supply mains 48 of the induction motor through adjustable transformers 49. By adjustment of the transformers 47—47 and 49—49, any desired voltage may be maintained across the terminals of the secondary winding of the induction motor 42 and, consequently, its speed may be adjusted within wide limits.

While I have illustrated my invention in several embodiments thereof, it will be understood by those skilled in the art that it is susceptible of various minor changes and modifications without departing from the spirit thereof and I desire, therefore, that no limitations shall be placed thereupon except such as are imposed by the prior art or are specifically set forth in the appended claims.

I claim as my invention:

1. The method of supplying energy from one polyphase system to another of different and variable frequency which comprises connecting said systems by a mobile conducting member which may make contact, at one end, with each phase of one system in succession and, at the other end, with each phase of the other system in succession, and causing said conductor to make contact with the terminals of one system at a different rate than with the terminals of the other system, said rate of making contact with the second system being adjustable.

2. The combination with two polyphase systems of distribution, each of which is provided with a neutral point, of a connection between said neutral points, a mobile conductor adapted to make contact, at one end, with each phase of one system in succession and, at the other end, with each phase of the other system in succession, and means for causing said mobile conductor to make contact, at one end, at a different rate than at the other end, whereby current will be derived from one system and supplied to the other system at a different frequency.

3. The combination with two polyphase systems of distribution of different numbers of phases, each of which is provided with a neutral point, of a connection between said neutral points, a mobile conductor adapted to make contact, at one end, with each phase of one system in succession and, at the other end, with each phase of the other system in succession, and means for causing said mobile conductor to make contact, at one end, at a different rate than at the other end, whereby current will be derived from one system and supplied to the other system at a different frequency.

4. The combination with two polyphase systems of distribution, each of which is provided with a neutral point, of a connection between said neutral points, a mobile vapor conductor adapted to make contact, at one end, with each phase of one system in succession and, at the other end, with each phase of the other system in succession, and magnetic means for causing said mobile conductor to make contact, at one end, at a different rate than at the other end, whereby current will be derived from one system and supplied to the other system at a different frequency.

5. The combination with two polyphase systems of distribution of different numbers of phases, each of which is provided with a neutral point, of a connection between said neutral points, a mobile vapor conductor adapted to make contact, at one end, with each phase of one system in succession and, at the other ends, with each phase of the other system in succession, and magnetic means for causing said mobile conductor to make contact, at one end, at a different rate than at the other end, whereby current will be derived from one system and supplied to the other system at a different frequency and phase number.

6. The combination with a polyphase system of supply, of a polyphase consumption circuit, each of said systems being provided with a neutral point, of a connection between said neutral points, a mobile vapor conductor adapted to make contact, at one end, with each phase of said supply system in succession and, at the other end, with each phase of said consumption circuit in succession, and means for producing an actuating magnetic field across the path of said vapor conductor at the end adjacent the terminals of said consumption circuit for the movement of said vapor conductor at any desired speed, whereby said consumption circuit is supplied with energy from said supply circuit at a different frequency therefrom.

7. The combination with a polyphase system of supply, of a polyphase consumption circuit having a different number of phases, each of said systems being provided with a neutral point, a connection between said neutral points, a mobile vapor conductor adapted to make contact, at one end, with each phase of said supply system in succession and, at the other end, with each phase of said consumption circuit in succession, and means for producing an actuating magnetic field across the path of said vapor conductor at the end adjacent the terminals of said consumption circuit for the movement of said vapor conductor at any desired speed, whereby said consumption circuit is supplied with energy from said supply circuit at a different frequency and phase number.

8. The combination with a polyphase supply circuit, of an exhausted container, a plurality of anodes therein and connected respectively to the different phases of said supply circuit, a consumption circuit, a plurality of cathodes in said container arranged substantially in a ring and connected respectively to the phases of said consumption circuit, means for producing a unidirectional magnetic flux across each of said cathodes but one, means for causing said void in the magnetic field to pass successively to each of the cathodes at any desired rate, and a connection between the neutral points of said supply and consumption circuits, whereby, when an arc is initiated within said container between said anodes and said cathodes, said arc will be caused to operate in succession at each of said cathodes and alternating currents will be caused to flow in said consumption circuit of a different frequency from that of the supply circuit.

9. The combination with a polyphase supply circuit, of an exhausted container, a plurality of anodes therein and connected respectively to the different phases of said supply circuit, a consumption circuit having a different number of phases from said supply circuit, a plurality of cathodes in said container arranged substantially in a ring and connected, respectively to the phases of said consumption circuit, means for producing a unidirectional magnetic flux across each of said cathodes but one, means for causing said void in the magnetic field to pass successively to each of the cathodes at any desired rate, and a connection between the neutral points of said supply and consumption circuits, whereby, when an arc is initiated within said container between said anodes and said cathodes, said arc will be caused to operate in succession at each of said cathodes and alternating currents will be caused to flow in said consumption circuit of a different frequency and phase number from those flowing in the supply circuit from that of the supply circuit.

10. The combination with an evacuated container, of an anode and a plurality of cathodes therein, means tending to establish an arc between said anode and all of said cathodes, and means for extinguishing said arc if established at some of said cathodes.

11. The combination with an evacuated container, of an anode and a plurality of cathodes therein, means tending to establish an arc between said anode and all of said cathodes, means for extinguishing said arc if established at a portion of said cathodes, and means for causing each of said cathodes, in succession, to be subject to the action of said extinguishing means.

12. In vapor electric apparatus, the combination with a reconstructing cathode, of a plurality of anodes adjacent thereto and energized from a common source, means for normally biasing an arc therebetween toward one of said anodes, and means for intermittently overcoming said biasing means and for causing said arc to flow from the other anode.

13. In vapor electric apparatus, the combination with a reconstructing cathode, of a pair of auxiliary anodes adjacent thereto and energized from a common source, means for normally biasing an arc therebetween toward one of said anodes, means for intermittently overcoming said biasing means and for causing said arc to flow from the other anode, a main anode, means tending to establish and maintain an arc between said main anode and said cathode, and means for preventing the establishment of said arc except when said biasing means are operative, whereby said main arc will flow intermittently.

In testimony whereof, I have hereunto subscribed my name this 12th day of March, 1915.

FRIEDRICH W. MEYER.

Witnesses:
D. C. DAVIS,
B. B. HINES.